United States Patent
MacMurray et al.

(10) Patent No.: US 8,876,955 B2
(45) Date of Patent: Nov. 4, 2014

(54) REMOVAL OF DISSOLVED GASES FOR BOILER FEED WATER PREPARATION

(71) Applicant: Air Products and Chemicals Inc., Allentown, PA (US)

(72) Inventors: Joel Charles MacMurray, Allentown, PA (US); Gary Stuart Roth, Fogelsville, PA (US); Russell Ira Snyder, III, Allentown, PA (US); Gerald Michael Loughney, Collegeville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/912,271

(22) Filed: Jun. 7, 2013

(65) Prior Publication Data
US 2014/0083838 A1    Mar. 27, 2014

Related U.S. Application Data (63) Continuation-in-part of application No. 13/632,586, filed on Oct. 1, 2012.

(30) Foreign Application Priority Data

Sep. 24, 2012  (EP) .................................. 12185758
May 17, 2013  (EP) .................................. 13168257

(51) Int. Cl.
*B01D 19/00*         (2006.01)
*C02F 1/20*          (2006.01)

(52) U.S. Cl.
CPC .............. *C02F 1/20* (2013.01); *B01D 19/0036* (2013.01)

USPC .......... 95/244; 95/264; 95/266; 95/15; 95/19; 96/173; 96/174

(58) Field of Classification Search
CPC ......................... B01D 19/0036; B01D 19/001
USPC ........................................... 95/244, 264, 266
See application file for complete search history.

(56) References Cited

U.S. PATENT DOCUMENTS 346,198 A * 7/1886 Fowler ........................... 95/260
2,078,288 A * 4/1937 Sherman ........................ 95/244
(Continued)

FOREIGN PATENT DOCUMENTS

DE        30 41 564 A1     6/1982
DE        3041564 A1       6/1982
(Continued)

OTHER PUBLICATIONS

Mark's Mechanical Engineers Handbook, 6th Edition, Theodore Baumeister, Editor, McGraw-Hill Book Company, 1958, p. 6-126.

*Primary Examiner* — Duane Smith
*Assistant Examiner* — Douglas Theisen
(74) *Attorney, Agent, or Firm* — Bryan C. Hoke, Jr.

(57) ABSTRACT

Method for removing dissolved gases from water to produce boiler feed water in a catalytic steam reforming process where boiler feed water is heated by indirect heat transfer with a reformate stream and/or a combustion product gas stream and the boiler feed water subsequently flash vaporized to form steam and residual liquid water, where the steam formed by flash vaporization strips the dissolved gases from the water.

20 Claims, 4 Drawing Sheets

(56) References Cited

U.S. PATENT DOCUMENTS

| | | | |
|---|---|---|---|
| 3,298,359 A | | 1/1967 | West et al. |
| 3,338,033 A | * | 8/1967 | Ross ............................... 96/157 |
| 3,441,393 A | | 4/1969 | Finneran et al. |
| 4,205,963 A | | 6/1980 | Estabrook et al. |
| 5,415,673 A | * | 5/1995 | Hilton et al. ................. 48/197 R |
| 5,728,200 A | * | 3/1998 | Bekedam ........................ 96/158 |

FOREIGN PATENT DOCUMENTS

| | | |
|---|---|---|
| RU | 2147558 | 4/2000 |
| RU | 2155713 | 9/2000 |
| RU | 2248325 | 3/2005 |
| WO | 2005/082776 A2 | 9/2005 |
| WO | 2005082776 A2 | 9/2005 |
| WO | 2012/078299 A1 | 6/2012 |
| WO | 2012078299 A1 | 6/2012 |

\* cited by examiner

FIG. 3 – Comparative Case

FIG. 4

REMOVAL OF DISSOLVED GASES FOR BOILER FEED WATER PREPARATION

CROSS-REFERENCE TO RELATED APPLICATIONS

This application is a continuation-in-part of application Ser. No. 13/632,586, filed on Oct. 1, 2012, which claims priority to European Patent Application EP12185758.5 filed Sep. 24, 2012. This application claims priority to U.S. patent application Ser. No. 13/632,586, filed on Oct. 1, 2012, European Patent Application EP12185758.5 filed Sep. 24, 2012, and European Patent Application EP13168257.7 filed May 17, 2013, all of which are incorporated herein in its entirety.

BACKGROUND

As quoted from Mark's Mechanical Engineers Handbook, $6^{th}$ Edition, Theodore Baumeister, Editor, McGraw-Hill Book Company, 1958, p. 6-126:

"Non-condensible gases released from water in boilers are probably the greatest single cause of corrosion in boiler tubes, drums, economizers, and superheaters. Oxygen corrosion produces rapid pitting, and it is recognized that the rate of corrosion is directly proportional to the dissolved oxygen concentration of the feed water. Other dissolved gases, such as carbon dioxide, hydrogen sulphide, and compounds which release gaseous products also accelerate the rate of attack at high pressures and temperatures.

The removal of gases from feed water is effected in modern steam stations by mechanical (vacuum) and thermal deaeration, by the addition of chemicals, or by a combination of those processes. The basic method is to heat the water by direct contact with steam in either open heaters or in the more efficient type known as deaerating heaters. In general the water is sprayed, atomized, or trickled over a stack of metal trays, to present the largest possible surface, while steam is admitted and directed so as to sweep out the non-condensible gases as they flash out of solution. By use of steam at not less than 5 psi (227 F), efficient distribution, and liberal venting through a vent condenser, residual oxygen can be reduced to 0.005 ml per liter."

Steam is a feedstock for catalytic steam reforming processes. Boiler feed water is prepared and steam made from the boiler feed water for use in catalytic steam reforming processes.

Industry desires thermally efficient methods for removing dissolved gases from feed water.

BRIEF SUMMARY

The present invention relates to a catalytic steam reforming process. More specifically, the present invention relates to a method for removing dissolved gases from a water feed in a catalytic steam reforming process.

There are several aspects of the method as outlined below.

Aspect 1. A method for removing dissolved gases from a water feed in a catalytic steam reforming process, the method comprising:

(a) heating a first portion or all of a boiler feed water stream in a heat exchanger by indirect heat transfer with at least one of a reformate stream from the catalytic steam reforming process and a combustion product gas stream from the catalytic steam reforming process;

(b) flash vaporizing the boiler feed water stream thereby forming steam and a residual liquid water, the boiler feed water stream having a first temperature and a first pressure prior to flash vaporizing;

(c) stripping dissolved gases from the water feed with the steam formed in step (b) thereby forming additional boiler feed water from the water feed; and (d) combining the additional boiler feed water with the residual liquid water for use as boiler feed water in the catalytic steam reforming process.

Aspect 2. The method of aspect 1 wherein the dissolved gases stripped from the water feed form gases in a vent stream also containing steam, and wherein at least 20% of the energy required to convert water at a pressure and temperature of the water feed into steam at a mass flow rate, pressure, and temperature of the vent stream is provided by the boiler feed water stream.

Aspect 3. The method of aspect 2 wherein at least 50%, or at least 60%, or at least 70%, or at least 80%, or at least 90%, or 100% of the energy required to convert water at a pressure and temperature of the water feed into steam at a mass flow rate, pressure, and temperature of the vent stream is provided by the boiler feed water stream.

Aspect 4. The method of aspect 1 wherein the dissolved gases stripped from the water feed form gases in a vent stream also containing steam, and wherein $$\frac{Q_{BFW}}{Q_{DEA}} > 0.2$$

where $Q_{BFW} = \dot{m}_B(\overline{H}_B - \overline{H}_Z)$ and $Q_{DEA} = \dot{m}_C \overline{H}_C - \dot{m}_E \overline{H}_E - (\dot{m}_C - \dot{m}_E)\overline{H}_Z$, where $\dot{m}_B$ is the mass flow rate of the boiler feed water stream, $\dot{m}_C$ is the mass flow rate of the water feed, $\dot{m}_E$ is the mass flow rate of the vent stream, $\overline{H}_B$ is the specific enthalpy of the boiler feed water stream, $\overline{H}_Z$ is the specific enthalpy of the additional boiler feed water, $\overline{H}_C$ is the specific enthalpy of the water feed, and $\overline{H}_E$ is the specific enthalpy of the vent stream.

Aspect 5. The method of aspect 4 wherein $$\frac{Q_{BFW}}{Q_{DEA}} > 0.5,$$

or $$\frac{Q_{BFW}}{Q_{DEA}} > 0.6,$$

or $$\frac{Q_{BFW}}{Q_{DEA}} > 0.7,$$

or $$\frac{Q_{BFW}}{Q_{DEA}} > 0.8,$$

or $$\frac{Q_{BFW}}{Q_{DEA}} > 0.9,$$

or $$\frac{Q_{BFW}}{Q_{DEA}} = 1.$$

Aspect 6. The method of any one of aspects 1 to 5 wherein the first temperature ranges from 110° C. to 155° C. or from 115° C. to 155° C. and the first pressure ranges from 450 kPa to 1500 kPa.

Aspect 7. The method of any one of aspects 1 to 6 wherein the boiler feed water flash vaporized in step (b) is flashed to a pressure less than 450 kPa, or is flashed to a pressure ranging from 115 kPa to 170 kPa.

Aspect 8. The method of any one of aspects 1 to 7 wherein the first portion or all of the boiler feed water stream heated in step (a) has a temperature less than 95° C. or less than 65° C. and a pressure ranging from 450 kPa to 1500 kPa prior to heating.

Aspect 9. The method of any one of aspects 1 to 8 further comprising:
  measuring the first pressure;
  comparing the measured first pressure to a set point pressure criterion for the first pressure; and
  adjusting the first pressure with a pressure control valve in response to comparing the measured first pressure with the set point pressure criterion for the first pressure.

Aspect 10. The method of any one of aspects 1 to 9 wherein the first portion of the boiler feed water stream is heated in the heat exchanger and a second portion of the boiler feed water stream bypasses the heat exchanger; the method further comprising:
  (e) blending the first portion of the boiler feed water stream with the second portion of the boiler feed water stream prior to step (b).

Aspect 11. The method of aspect 10 wherein the first portion of the boiler feed water stream has a first mass flow rate, $F_1$, and the second portion of the boiler feed water steam has a second mass flow rate, $F_2$, wherein the first portion and second portion are blended with a mass flow rate ratio, $$\frac{F_1}{F_2},$$

the method further comprising:
  measuring the temperature of the boiler feed water stream prior to step (b) and after step (e);
  comparing the measured temperature to a set point temperature criterion;
  increasing the mass flow rate ratio, $$\frac{F_1}{F_2},$$

when the measured temperature is less than required by the set point temperature criterion; and
  decreasing the mass flow rate ratio, $$\frac{F_1}{F_2},$$

when the measured temperature is greater than required by the set point temperature criterion.

Aspect 12. The method of any one of aspects 1 to 9 wherein the mass flow rate of the at least one of the reformate stream and the combustion product gas stream passed to the heat exchanger is regulated to control heating between the first portion or all of the boiler feed water stream and the at least one of the reformate stream and the combustion product gas stream.

Aspect 13. The method of aspect 12, wherein the method further comprises:
  measuring the temperature of the boiler feed water stream prior to step (b);
  comparing the measured temperature to a set point temperature criterion;
  increasing the mass flow rate of the at least one of the reformate stream and the combustion product gas stream passed to the heat exchanger when the measured temperature is less than required by the set point temperature criterion; and
  decreasing the mass flow rate of the at least one of the reformate stream and the combustion product gas stream passed to the heat exchanger when the measured temperature is greater than required by the set point temperature criterion.

Aspect 14. The method of any one of aspects 11 through 13 wherein the boiler feed water stream flash vaporized in step (b) is flash vaporized in a vessel, the method further comprising:
  measuring a pressure representative of the vapor pressure in the vessel;
  comparing the measured pressure to a set point pressure criterion for the vapor pressure in the vessel;
  changing the set point temperature criterion to require a higher measured temperature when the measured pressure is less than required by the set point pressure criterion for the vapor pressure in the vessel; and
  changing the set point temperature criterion to require a lower measured temperature when the measured pressure is greater than required by the set point pressure criterion for the vapor pressure in the vessel.

Aspect 15. The method of any one of aspects 1 to 14 wherein the first portion or all of the boiler feed water stream is heated in the heat exchanger by indirect heat transfer with the reformate stream, the method further comprising:
  separating the reformate stream from the heat exchanger in a pressure swing adsorber to form a hydrogen product gas and a pressure swing adsorber residual gas.

Aspect 16. The method of any one of aspects 1 to 15 wherein the first portion or all of the boiler feed water stream is heated in the heat exchanger by indirect heat transfer with the combustion product gas stream, the method further comprising:
  separating a reformate stream from the catalytic reforming process, which reformate stream can be the reformate of step (a), in a pressure swing adsorber to form a hydrogen product gas and a pressure swing adsorber residual gas; and
  combusting the pressure swing adsorber residual gas with an oxidant gas external to a plurality of catalyst containing reforming tubes in a reforming furnace, thereby forming the combustion product gas stream.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The phrase "at least a portion" means "a portion or all." The at least a portion of a stream may have the same composition as the stream from which it is derived. The at least a portion of a stream may include specific components of the stream from which it is derived.

As used herein, "first," "second," "third," etc. are used to distinguish from among a plurality of steps and/or features, and is not indicative of the relative position in time and/or space.

As used herein, all pressures are absolute pressures unless specifically identified as gauge pressures.

The present invention relates to a catalytic steam reforming process. More specifically, the present invention relates to a method for removing dissolved gases from a water feed in a catalytic steam reforming process.

A catalytic steam reforming process, also called a steam methane reforming (SMR) process, or steam reforming process, is defined as any process used to convert reformer feedstock to synthesis gas by reaction of a hydrocarbon and steam over a catalyst. The term "synthesis gas," commonly called syngas, is used herein to mean any mixture comprising hydrogen and carbon monoxide. The reforming reaction is an endothermic reaction and may be described generally as Hydrogen is generated when synthesis gas is generated.

A catalytic steam reformer is a reactor for performing the reforming reaction. A catalytic steam reformer, also called a steam methane reformer, is defined herein as any fired furnace used to convert reformer feedstock containing elemental hydrogen and carbon to synthesis gas by a reaction with steam over a catalyst with heat provided by combustion of a fuel. Feedstock may be natural gas, methane, naphtha, propane, refinery fuel gas, refinery offgas, or other suitable reformer feedstock known in the art. Suitable operating temperatures range from 350° C. to 650° C. at the inlet and 750° C. to 950° C. at the outlet. Suitable pressures range from 1 to 50 atm. Preferred operating conditions for a catalytic steam reformer are known in the art.

The reformer comprises a combustion section (also called the radiative section) for performing a combustion reaction; a plurality of catalyst-containing tubes for performing a reforming reaction, the plurality of catalyst-containing tubes located within the combustion section where a fuel is combusted external to the plurality of catalyst-containing tubes to provide heat for the reforming reaction and forming combustion product gases; and a heat exchanger section downstream of the combustion section for receiving combustion product gases from the combustion section and for transferring heat from the combustion product gases to other process streams.

The dissolved gases may include, for example, one or more of nitrogen, oxygen, and carbon dioxide. As discussed in the background section, dissolved gases need to be removed to prevent corrosion in boiler tubes, drums, economizers, and superheaters.

The method is described with reference to FIG. 1. For the purposes of simplicity and clarity, detailed descriptions of well-known devices, circuits, and methods are omitted so as not to obscure the description of the present invention with unnecessary detail.

The method comprises heating a first portion 22 or all of a boiler feed water stream 20 in a heat exchanger 14 by indirect heat transfer with at least one of a reformate stream 30 from the catalytic steam reforming process and a combustion product gas stream 32 from the catalytic steam reforming process. As shown in FIG. 1, one or more boiler feed water streams 6 and 8 may be combined to form the boiler feed water stream 20. Boiler feed water stream 20 may be divided into a first portion 22 which is passed to heat exchanger 14 to be heated by at least one of a reformate stream 30 and a combustion product gas stream 32 and a second portion 24 which bypasses heat exchanger 14. The first portion 22 and the second portion 24 are then subsequently blended back together. Alternatively all of boiler feed water stream 20 may be passed to heat exchanger 14 to be heated by at least one of a reformate stream 30 and a combustion product gas stream 32. Prior to heating, boiler feed water stream 20 (and consequently the first portion 22) may have a temperature less than 95° C. or less than 65° C. and may have a pressure ranging from 450 kPa to 1500 kPa.

Heat exchanger 14 may be any suitable heat exchanger for transferring heat from the reformate stream 30 and/or the combustion product gas stream 32. Although shown in the drawing as a single heat exchanger, one or more heat exchangers may be used, consistent with the meaning that the articles "a", "an", and "the" mean "one or more" when applied to any feature.

Combustion product gas stream 32 comprises combustion product gases from the combustion section of the catalytic steam reformer. In the case where the combustion product gas stream 32 heats the first portion or all of the boiler feed water stream, heat exchanger 14 may be in what is known as the convection section of the reformer.

The process gas formed by the reforming reaction is called a reformate. As used herein, a reformate is any mixture comprising hydrogen and carbon monoxide formed from the reforming reaction of a hydrocarbon and steam and includes reformate that has been shifted in a water-gas shift reaction. Reformate stream 30 is any stream comprising reformate from the catalytic steam reforming process including shifted reformate or otherwise modified reformate.

Shift reactors, also called water-gas shift reactors, and their operation are well-known in the art. One or more shift reactors may be employed. Shift reactors comprise a vessel containing a catalyst bed through which CO and $H_2O$ flows to form $H_2$ and $CO_2$. The one or more shift reactors may be high temperature, medium temperature, low temperature and/or isothermal shift reactors. High temperature shift reactors may operate at about 350° C. to 450° C. and typically use a non-noble metal catalyst such as mixture of $Fe_3O_4$ and $Cr_2O_3$ (i.e. about 55 wt % Fe and 6% Cr). Low temperature shift reactors may operate at about 200° C. to 260° C. and may use a non-noble catalyst such as Cu—ZnO—$Al_2O_3$, or Cu—ZnO—$Cr_2O_3$. Medium temperature shift reactors operate in the same temperature range as low temperature shift reactors and use a similar catalyst. Low temperature shift reactors are used in combination with high temperature shift reactors, whereas medium temperature shift reactors may be operated without an upstream high temperature shift reactor. Medium temperature shift catalyst is designed to withstand a higher temperature rise through the catalyst bed. Some CO remains after the water-gas shift reaction and there is therefore CO in the effluent of the shift reactor.

Shift reactors and suitable shift catalysts are known in the art. Any suitable shift catalyst may be used. One skilled in the art can readily select a suitable shift catalyst.

The method comprises flash vaporizing the boiler feed water stream 20 thereby forming steam 26 and a residual liquid water 28. Boiler feed water stream 20 may be flash vaporized in vessel 90, which may be called a deaerator. An additional steam stream (not shown) may be introduced into vessel 90, if desired.

Boiler feed water stream 20 has a first temperature and a first pressure prior to flash vaporizing. The first temperature may range from 110° C. to 155° C. or 115° C. to 155° C. The first pressure may range from 450 kPa to 1500 kPa.

The boiler feed water may be flash vaporized to a pressure less than 450 kPa or may be flash vaporized to a pressure ranging from 115 kPa to 170 kPa.

The method further comprises stripping dissolved gases from the water feed 10 with the steam 26 formed by flash vaporizing and additional steam, if added, thereby forming additional boiler feed water 12 from the water feed 10.

The dissolved gases are stripped from the water feed 10 in the stripping section 80 of vessel 90 to form gases in vapor stream 84. Vapor stream 84 comprises steam and gases formed from the dissolved gases stripped from the water feed. The gases stripped from the water feed are removed from vessel 90 through vent stream 94, which also contains steam.

The method differs from conventional deaeration methods since no additional steam needs to be added directly to the deaerator. The advantage of flash vaporizing the boiler feed water to generate steam for stripping, instead of direct injection of steam is increased recovery of energy from the catalytic steam reforming process or combustion product gas stream. In advantageous embodiments no additional steam is added to the deaerator. In principal, however, the method may include flash vaporizing the boiler feed water and direct addition of steam to the deaerator as well. The more of the steam for stripping is generated by flash vaporizing boiler feed water, and accordingly the less injected as additional steam, the more of the energy from the catalytic steam reforming process or combustion product gas stream can be recovered and energy saved in the production of additional steam.

A design criteria for stripping dissolved gases from water feed may be selected, for example, the amount of steam in the vent stream expressed as a fraction, $\phi$, of water feed. For example, the design criteria may be that the mass flow rate of steam in the vent stream is 0.5% of the mass flow rate of water feed (i.e. $\phi=0.005$). From a design standpoint, this sets the amount of energy required to form the steam in the vent stream.

Advantageously, at least 20% of the energy required to convert water at a pressure and temperature of the water feed stream into steam at a mass flow rate, pressure, and temperature of the vent stream 94 is provided by the boiler feed water stream 20. The balance of the energy may be provided by direct injection of steam or other heat source. More advantageously, at least 50%, or at least 60%, or at least 70%, or at least 80%, or at least 90% of the energy required to convert water at a pressure and temperature of the water feed stream into steam at a mass flow rate, pressure, and temperature of the vent stream 94 is provided by the boiler feed water stream 20. Most advantageously, all of the energy required to convert water at a pressure and temperature of the water feed into steam at a mass flow rate, pressure, and temperature of the vent stream 94 is provided by the boiler feed water stream 20.

The total energy required to convert water at a pressure and temperature of the water feed stream into steam at a mass flow rate, pressure, and temperature of the vent stream, and percent energy provided by the boiler feed water stream may be readily calculated from material and energy balances. Enthalpies for steam and water are available from standard steam tables. The contribution of the dissolved gases to the energy and mass balances can be ignored.

Figure 2:
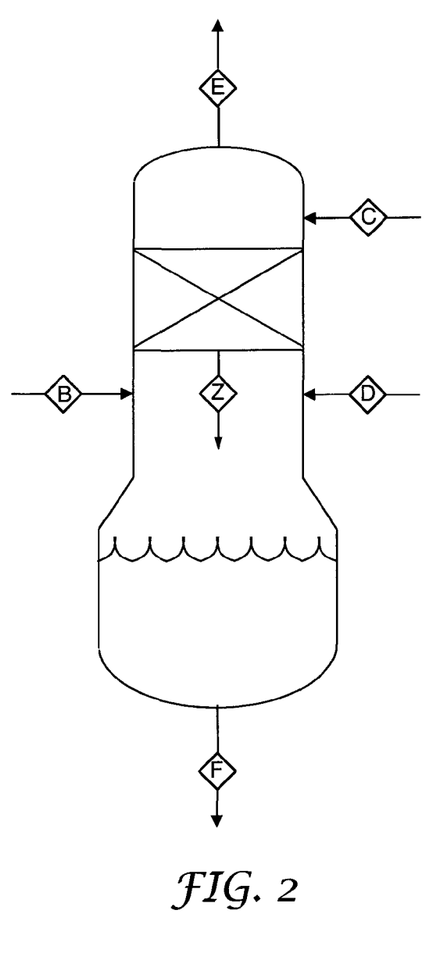
FIG. 2 is a drawing of a deaerator showing inlet and outlet streams.

For example, with reference to FIG. 2, a material and energy balance may be formed around the deaerator, where stream B is heated boiler feed water, stream C is water feed, stream D is injected steam, stream E is the vent stream, stream Z is the additional boiler feed water leaving the stripping section, and stream F is the boiler feed water leaving the deaerator.

The mass flow rate, $\dot{m}_E$ of steam in vent stream E, may be calculated from the design criteria as $\dot{m}_E = \phi \times \dot{m}_C$, where $\dot{m}_C$ is the mass flow rate of water feed stream C.

The overall mass balance for the deaerator is $\dot{m}_C + \dot{m}_B + \dot{m}_D = \dot{m}_E + \dot{m}_F$, where $\dot{m}_C$ is the mass flow rate of stream C, $\dot{m}_B$ is the mass flow rate of stream B, $\dot{m}_D$ is the mass flow rate of stream D, $\dot{m}_E$ is the mass flow rate of stream E, and $\dot{m}_F$ is the mass flow rate of stream F.

From an energy balance, the total energy, $Q_{DEA}$, required to convert water at a pressure and temperature of the water feed stream C into steam at a mass flow rate, $\dot{m}_E$, and pressure and temperature of the vent stream E may be calculated from $Q_{DEA} = \dot{m}_C \overline{H}_C - \dot{m}_E \overline{H}_E - (\dot{m}_C - \dot{m}_E) \overline{H}_Z$, where $\overline{H}_C$ is the specific enthalpy of stream C, $\overline{H}_E$ is the specific enthalpy of stream E, $\overline{H}_Z$ is the specific enthalpy at point Z, which is the enthalpy of saturated water leaving the stripping section at the deaerator temperature and pressure (i.e. the additional boiler feed water formed from the water feed).

The specific enthalpy, $\overline{H}_Z$, of the water leaving the stripping section in stream Z, may be determined from steam tables as the enthalpy of saturated water at the temperature and pressure in the deaerator. The specific enthalpy, $\overline{H}_E$, of the steam leaving vent stream E, may be determined from steam tables as the specific enthalpy of saturated vapor at the temperature and pressure in the deaerator. The specific enthalpy, $\overline{H}_C$, of the water feed stream C may be determined from the temperature and pressure of the water feed stream and suitable thermodynamic property table or calculation.

Then the percent of the energy provided by the boiler feed water stream to convert water at a pressure and temperature of the water feed stream into steam at a mass flow rate, pressure, and temperature of the vent stream is $$\frac{Q_{BFW}}{Q_{DEA}}$$

expressed as a percentage, where $Q_{BFW}=\dot{m}_B(\overline{H}_B-\overline{H}_Z)$ where $\dot{m}_B$ is the mass flow rate of boiler feed water stream B, $\overline{H}_B$ is the specific enthalpy of the boiler feed water stream B, and $\overline{H}_Z$ is the specific enthalpy of saturated water at the deaerator temperature and pressure.

In case of injected steam stream D, the energy contribution from steam $Q_{steam}$ may be calculated from $Q_{steam}=\dot{m}_D(\overline{H}_D-\overline{H}_Z)$, where $\overline{H}_D$ is the specific enthalpy of stream D, and $\overline{H}_Z$ is the specific enthalpy of saturated water at the deaerator temperature and pressure. In case both steam and heated boiler feed water are introduced into the deaerator without other heating or cooling, an energy balance requires $Q_{DEA}=Q_{steam}+Q_{BFW}$.

The water feed 10 comprises what is often referred to as "make-up water." The water feed 10 may also comprise water condensate from the reformate. The water feed may be conditioned prior to being fed to vessel 90. Suspended solids may be removed by settling and decantation and/or by filtering. The water may be chemically treated and/or cation exchanged to remove hardness. The water may be demineralized for complete removal of dissolved solids.

The method further comprises combining the additional boiler feed water 12 with the residual liquid water 28 for use as boiler feed water 40 in the catalytic steam reforming process.

The method may further comprise measuring the pressure of the boiler feed water stream 20 prior to flash vaporizing, comparing the measured pressure to a set point pressure criterion for the pressure, and adjusting the pressure with a pressure control valve in response to comparing the measured pressure with the set point pressure criterion. As shown in FIG. 1, the pressure of boiler feed water stream 20 in heat exchanger 14 may be maintained by a pressure control valve 70. The pressure is maintained to avoid boiling of the boiler feed water stream in the heat exchanger.

The pressure may be measured, for example, by a pressure transducer, and compared to the set point pressure criterion by pressure controller 25. The pressure controller 25 may send a signal to pressure control valve 70 to adjust the pressure in response to the measured pressure. The pressure controller 25 and pressure control valve 70 may be separate devices or a single unit.

The set point pressure criterion may be, for example, a set point pressure or a set point pressure range. The set point pressure criterion may include deadband. Any suitable set point pressure criterion or criteria may be used.

The temperature of the boiler feed water stream 20 prior to flash vaporizing may be controlled in any number of ways.

For example, when the boiler feed water stream is divided into a first portion 22 and a second portion 24, the first portion 22 has a first mass flow rate, $F_1$, and the second portion 24 of the boiler feed water steam has a second mass flow rate, $F_2$. After heating the first portion 22, the first portion and second portion are blended with a mass flow rate ratio, $$\frac{F_1}{F_2}.$$

To control the temperature the method may further comprise measuring the temperature of the boiler feed water stream 20 after blending and prior to flash vaporizing. The temperature may be measured, for example, by a thermocouple as part of temperature controller 15. The measured temperature may then be compared to a set point temperature criterion by temperature controller 15. The set point temperature criterion may be, for example, a set point temperature or a set point temperature range. The set point temperature criterion may include deadband. Any suitable set point temperature criterion or criteria may be used.

In response to comparing the measured temperature to the set point temperature criterion, the mass flow rate ratio, $$\frac{F_1}{F_2},$$

is increased when the measured temperature is less than required by the set point temperature criterion, and the mass flow rate ratio, $$\frac{F_1}{F_2},$$

is decreased when the measured temperature is greater than required by the set point temperature criterion. As shown in FIG. 1, the relative mass flow rates of the first portion 22 and the second portion 24 are regulated by valve 50. Controller 15 sends a signal to valve 50 responsive to comparing the measured temperature to the set point temperature criterion to increase or decrease the mass flow rate of boiler feed water bypassed around heat exchanger 14. Alternatively valve 50 could be placed in the line of first portion of the boiler feed water stream.

Passing a greater portion of the boiler feed water stream through the heat exchanger 14 increases the temperature of the boiler feed water stream, while bypassing a greater portion of the boiler feed water stream around the heat exchanger 14 decreases the temperature of the boiler feed water stream prior to flash vaporizing.

Alternatively, the temperature of the boiler feed water stream 20 may be controlled by regulating the mass flow rate of the reformate stream 30 and/or the mass flow rate of the combustion product gas stream 32 used to heat the boiler feed water stream 20 in heat exchanger 14. In this alternative, the method comprises measuring the temperature of the boiler feed water stream 20 after heating and prior to flash vaporizing. The temperature may be measured, for example, by a thermocouple as part of temperature controller 15. The measured temperature may then be compared to a set point temperature criterion by temperature controller 15. The set point temperature criterion may be, for example, a set point temperature or a set point temperature range. The set point temperature criterion may include deadband. Any suitable set point temperature criterion or criteria may be used.

In response to comparing the measured temperature to the set point temperature criterion, the mass flow rate of the reformate stream 30 and/or the combustion product gas stream 32 that is passed to heat exchanger 14 is increased when the measured temperature is less than required by the set point temperature criterion, and the mass flow rate of the reformate stream 30 and/or the combustion product gas stream 32 that is passed to heat exchanger 14 is decreased when the measured temperature is greater than required by the set point temperature criterion.

The mass flow rate of the reformate stream 30 and/or the combustion product gas stream 32 may be regulated by forming a bypass stream 31 of reformate and/or a bypass stream 33 of combustion product gases and regulating the mass flow rates using valve 60. Controller 15 sends a signal to valve 60 responsive to comparing the measured temperature to the set point temperature criterion to increase or decrease the mass flow rate of reformate and/or combustion product gas bypassed around heat exchanger 14.

Control of the temperature of the boiler feed water stream before flash vaporizing may include a combination of the control methods described above, but this may add unnecessary complexity to the method.

The set point temperature criterion used by controller 15 may be adjusted responsive to the vapor pressure in vessel 90. This provides the benefit/advantages of controlling the amount of vented stream 94 to a desired level which achieves both the level of deaeration required and minimizing the energy and water loss in the vent stream.

The method may further comprise measuring a pressure representative of the vapor pressure in vessel 90. The vapor pressure may be measured in vessel 90 and/or in the outlet line from vessel 90. The vapor pressure may be measured by a pressure transducer as part of pressure controller 45.

The method may then further comprise comparing the measured pressure to a set point pressure criterion for the vapor pressure in vessel 90. Controller 45 then sends a signal to change the set point temperature criterion to require a higher measured temperature when the measured pressure is less than required by the set point pressure criterion for the vapor pressure in the vessel 90 and to change the set point temperature criterion to require a lower measured temperature when the measured pressure is greater than required by the set point pressure criterion for the vapor pressure in the vessel 90.

The set point pressure criterion may be, for example, a set point pressure or a set point pressure range. The set point pressure criterion may include deadband. Any suitable set point pressure criterion or criteria may be used.

The liquid level in vessel 90 may be controlled by level controller 35. Level controller 35 senses the liquid level in vessel 90 and controls the flow rate of water feed 10 via valve 38.

As the method is integrated with a catalytic steam reforming process, reformate may be separated in a pressure swing adsorber to form a hydrogen product gas and a pressure swing adsorber residual gas, and the pressure swing adsorber residual gas may be combusted with an oxidant gas external to the plurality of catalyst-containing reformer tubes in the reformer furnace thereby forming the combustion product gas stream.

EXAMPLES

Processes for deaerating water were simulated using computer simulation software to determine the effect of process modifications on energy efficiency.

Example 1

Comparative Case

Figure 3:
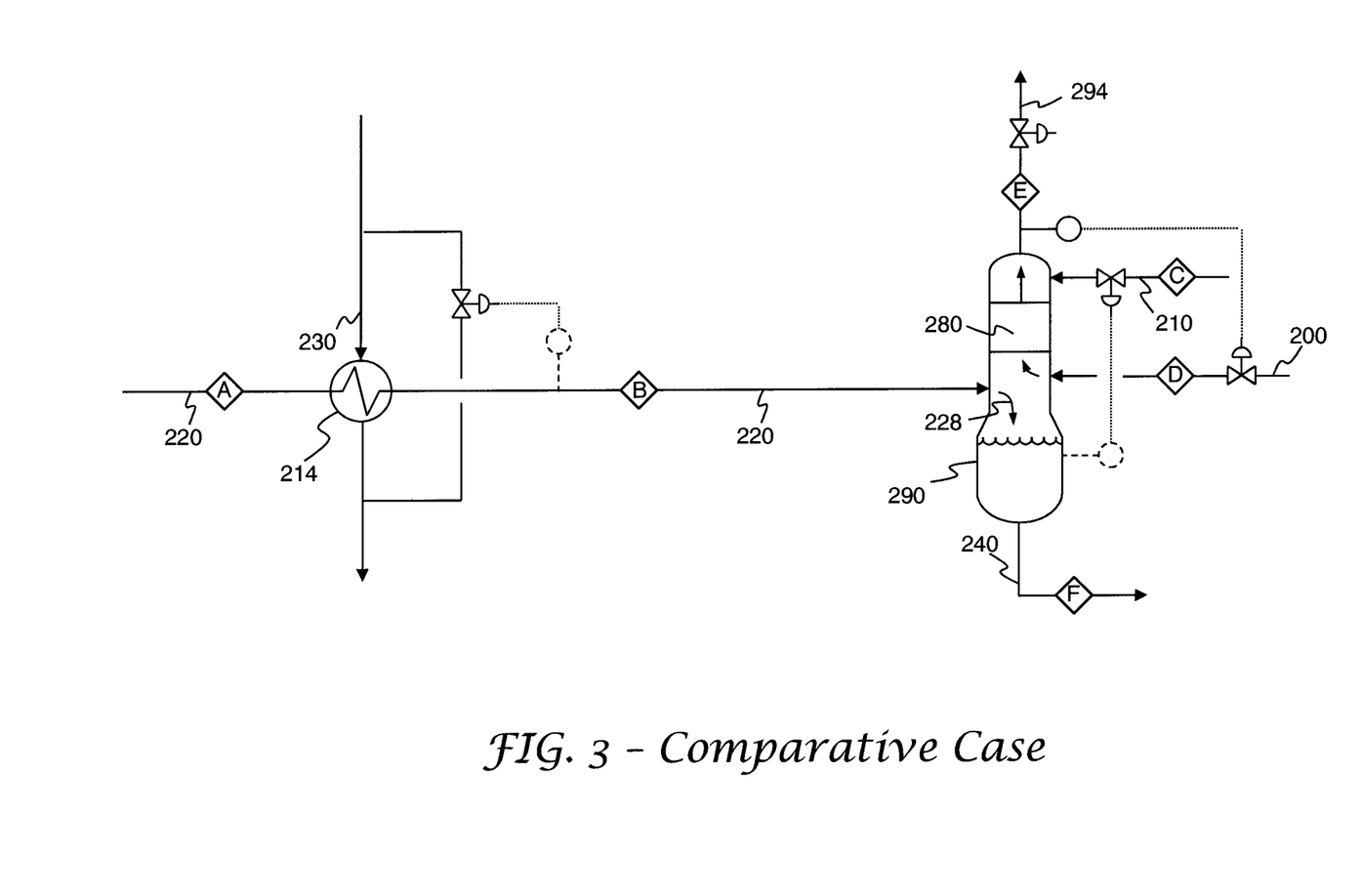
FIG. 3 is a process flow diagram for a comparative process for removing dissolved gases from a water feed.

FIG. 3 is a process flow diagram for a comparative case. Stream conditions at various points (A-F) in the process flow diagram are listed in Table 1.

Boiler feed water 220 having process conditions indicated at point A is passed through heat exchanger 214 to exchange heat by indirect heat transfer with a hot process stream 230. After heat exchange, the boiler feed water has process conditions indicated at point B.

TABLE 1

Stream conditions for Example 1.

| Stream | Flow Rate (kg/h) | Temperature (° C.) | Pressure (kPa) |
|---|---|---|---|
| A | 136,078 | 50 | 205 |
| B | 136,078 | 97 | 136 |
| C | 158,758 | 97 | 343 |
| D | 4,041 | 148 | 446 |
| E | 794 | 108 | 136 |
| F | 298,082 | 103 | 136 |

Boiler feed water 220 is introduced into deaerator 290 below the stripping section 280 and liquid water 228 accumulates in the bottom of the deaerator 290. Make-up water 210 having process conditions indicated at point C is introduced at the top of deaerator 290 above the stripping section 280. Steam 200 having process conditions indicated at point D is introduced below the stripping section 280 of deaerator 290 to strip dissolved gases from make-up water 210. Vent stream 294 comprising the dissolved gases and having process conditions indicated at point E is withdrawn from the top of deaerator 290. Boiler feed water 240 having process conditions at point F is withdrawn from the bottom of deaerator 290.

The energy recovered from a hot process gas stream is 7.5 MW, which is the same as the enthalpy gain by the boiler feed water going from point A to point B.

Example 2

Comparative Case

FIG. 3 is a process flow diagram for another comparative case. Stream conditions at various points (A-F) in the process flow diagram are listed in Table 2. As compared to Example 1, the pressure of streams A and B are increased.

Boiler feed water 220 having process conditions indicated at point A is passed through heat exchanger 214 to exchange heat by indirect heat transfer with a hot process stream 230. After heat exchange, the boiler feed water has process conditions indicated at point B.

TABLE 2

Stream conditions for Example 2.

| Stream | Flow Rate (kg/h) | Temperature (° C.) | Pressure (kPa) |
|---|---|---|---|
| A | 136,078 | 50 | 1,135 |
| B | 136,078 | 97 | 1,066 |
| C | 158,758 | 97 | 343 |
| D | 4,041 | 148 | 446 |
| E | 794 | 108 | 136 |
| F | 298,082 | 103 | 136 |

Boiler feed water 220 is introduced into deaerator 290 and liquid water 228 accumulates in the bottom of the deaerator 290. Make-up water 210 having process conditions indicated at point C is introduced at the top of deaerator 290 above the stripping section 280. Steam 200 having process conditions indicated at point D is introduced below the stripping section 280 of deaerator 290 to strip dissolved gases from make-up water 210. Vent stream 294 comprising the dissolved gases and having process conditions indicated at point E is withdrawn from the top of deaerator 290. Boiler feed water 240 having process conditions at point F is withdrawn from the bottom of deaerator 290.

The energy recovered from a hot process gas stream 230 is 7.5 MW, which is the same as the enthalpy gain in forming stream B from stream A. The energy recovered is the same as example 1 even though the pressure of streams A and B are increased compared to example 1. These results show that pressure has a small effect on the enthalpy of stream B.

Example 3

Flash Vaporization Case

Figure 1:
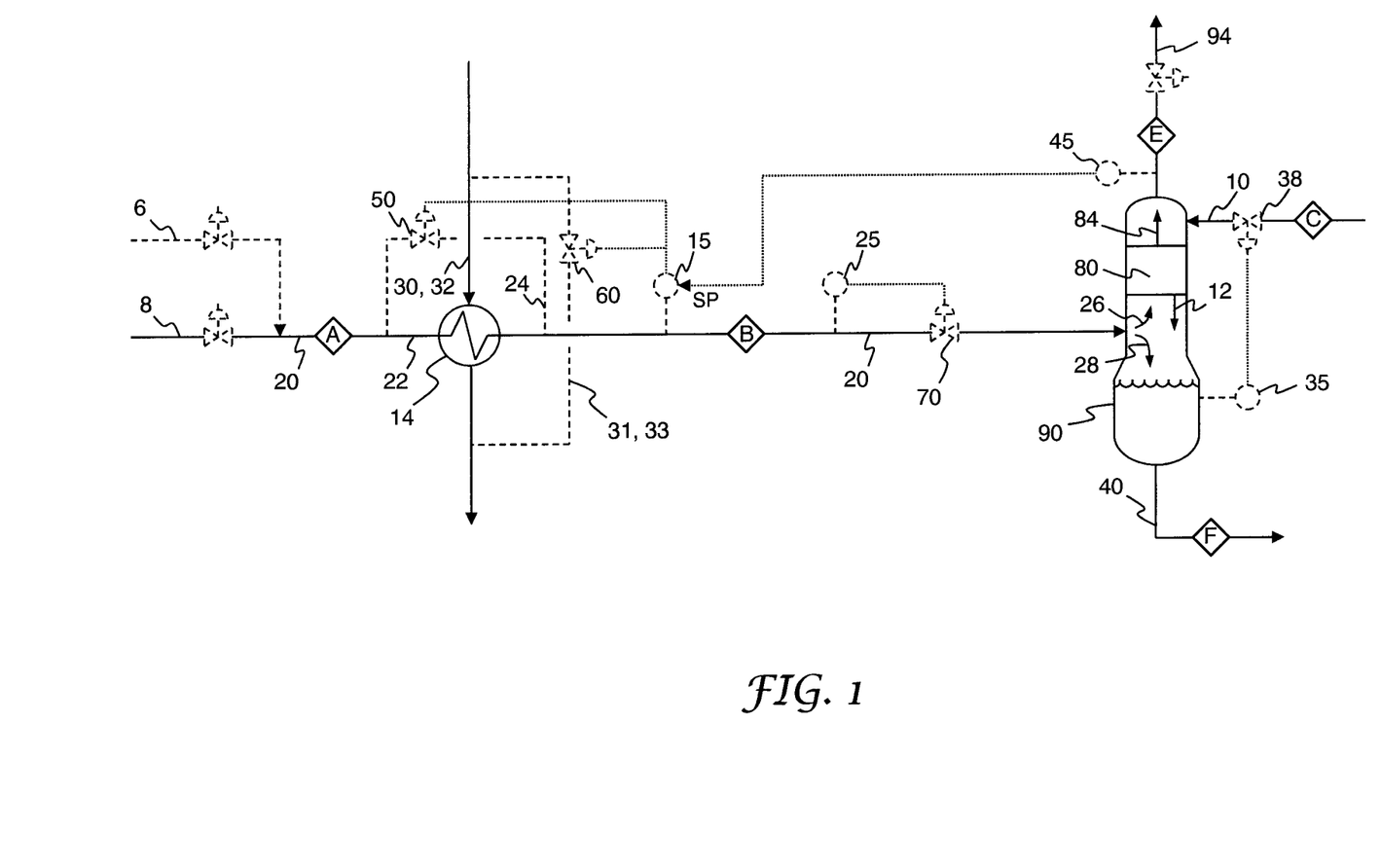
FIG. 1 is a process flow diagram for a process for removing dissolved gases from a water feed according to the present method.

Example 3 is described using the process flow diagram of FIG. 1.

Stream conditions at various points (A-F) in the process flow diagram of FIG. 1 are listed in Table 3 along with the simulation results for this case.

Boiler feed water 20 having process conditions indicated at point A is passed through heat exchanger 14 to exchange heat by indirect heat transfer with a hot process stream 30,32 resulting in boiler feed water 20 having process conditions indicated at point B.

TABLE 3

Stream conditions for Example 3.

| Stream | Flow Rate (kg/h) | Temperature (° C.) | Pressure (kPa) |
|---|---|---|---|
| A | 136,078 | 50 | 1,135 |
| B | 136,078 | 124 | 1,066 |
| C | 158,758 | 97 | 343 |
| D | — | — | — |
| E | 794 | 108 | 136 |
| F | 294,042 | 108 | 136 |

Boiler feed water 20 is introduced into the vessel 90 below the stripping section 80 and above the pool of liquid water. Water feed 10 having process conditions indicated at point C is introduced at the top of vessel 90 above the stripping section 80. No additional steam is added to vessel 90. Steam 26 flash vaporized from the boiler feed water strips dissolved gases from water feed 10. Vent stream 94 comprising the dissolved gases and having process conditions indicated at point E is withdrawn from the top of vessel 90 while boiler feed water 40 having process conditions indicated at point F is withdrawn from the bottom of vessel 90.

The energy recovered from the hot process stream for example 3 (flash vaporization case) is 11.8 MW versus only 7.5 MW for the example 1 (comparative case) resulting in a better overall energy efficiency for the process.

Example 4

Flash Vaporization with Steam Injection

Figure 4:
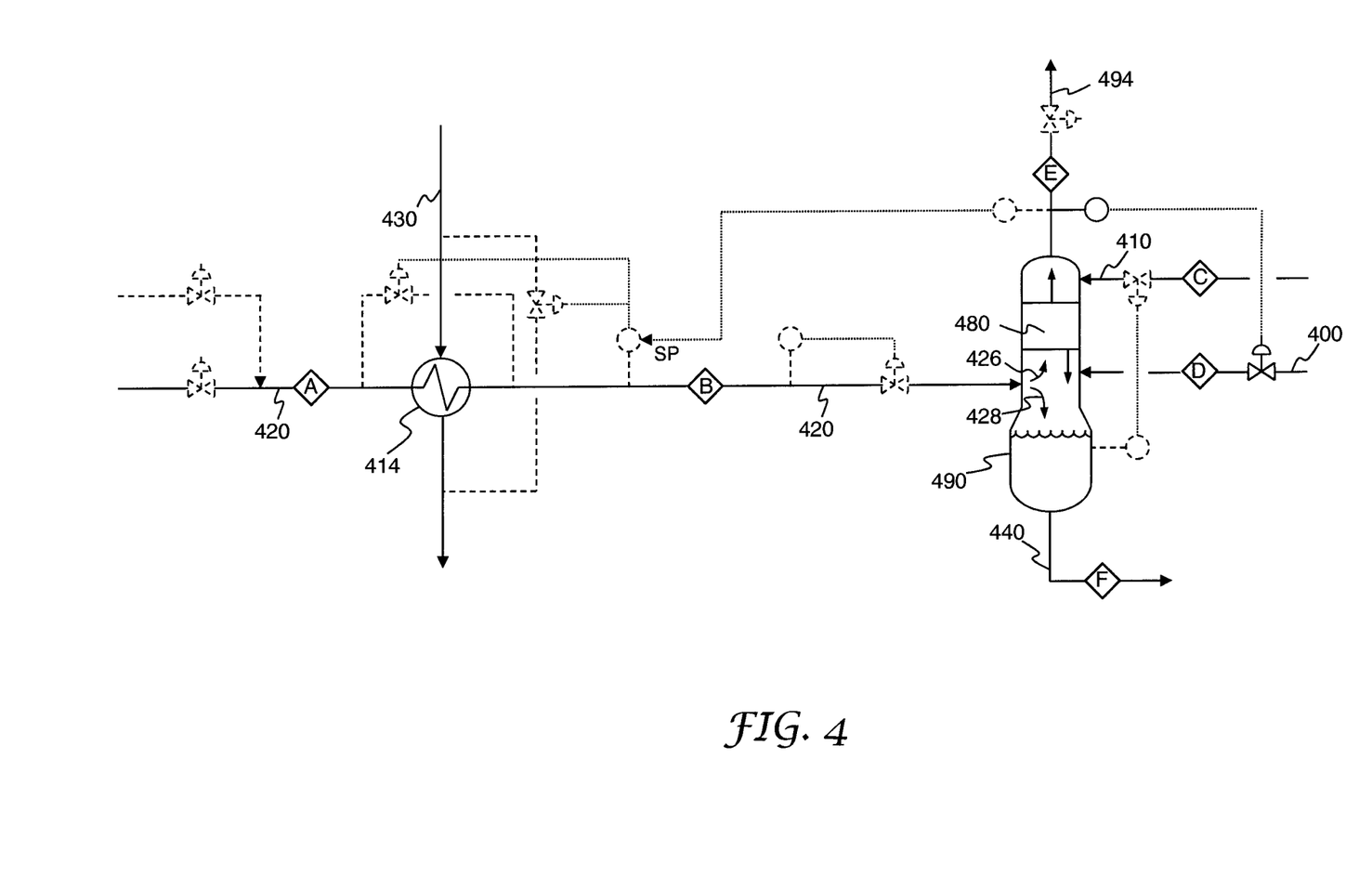
FIG. 4 is a process flow diagram for a process for removing dissolved gases from a water feed according to the present method with both flash vaporization and steam injection.

Example 4 is described using the process flow diagram of FIG. 4.

In Example 4, 20% of the energy required to form the steam in the vent stream is provided by the boiler feed water stream and 80% is provided by steam injection.

Stream conditions at various points (A-F) in the process flow diagram of FIG. 4 are listed in Table 4 along with the simulation results for this case.

TABLE 4

Stream conditions for Example 4.

| Stream | Flow Rate (kg/h) | Temperature (° C.) | Pressure (kPa) |
|---|---|---|---|
| A | 136,078 | 50 | 1135 |
| B | 136,078 | 111.5 | 1066 |
| C | 158,758 | 97 | 343 |
| D | 3,233 | 148 | 446 |
| E | 794 | 108 | 136 |
| F | 297,277 | 108 | 136 |

Boiler feed water 420 having process conditions indicated at point A is passed through heat exchanger 414 to exchange heat by indirect heat transfer with a hot process stream 430 resulting in boiler feed water 420 having process conditions indicated at point B.

Boiler feed water 420 is introduced into vessel 490 below the stripping section 480 and above the pool of liquid water. Water feed 410 having process conditions indicated at point C is introduced at the top of vessel 490. Steam flash vaporizes from the boiler feed water thereby forming steam 426 and a residual liquid water 428. Steam 400 having process conditions indicated at point D is introduced into vessel 490 below the stripping section 480 and above the pool of liquid water. The injected steam and steam that flash vaporized from the boiler feed water strip dissolved gases from make-up water 410. Vent stream 494 comprising the dissolved gases and having process conditions indicated at point E is withdrawn from the top of deaerator 490. Boiler feed water 440 having process conditions indicated at point F is withdrawn from the bottom of vessel 490.

The energy recovered from the hot process stream for example 4 (flash vaporization with steam injection case) is 9.8 MW versus only 7.5 MW for the example 1 (comparative case) resulting in a better overall energy efficiency for the process.

Example 5

Flash Vaporization with Steam Injection

Example 5 is described using the process flow diagram of FIG. 4.

In Example 5, 50% of the energy required to form the steam in the vent stream 494 is provided by the boiler feed water stream 420 and 50% is provided by steam injection stream 400.

Stream conditions at various points (A-F) in the process flow diagram of FIG. 4 are listed in Table 5 along with the simulation results for this case.

Boiler feed water 420 having process conditions indicated at point A is passed through heat exchanger 414 to exchange heat by indirect heat transfer with a hot process stream 430 resulting in boiler feed water 420 having process conditions indicated at point B.

Boiler feed water 420 is introduced into vessel 490 below the stripping section 480 and above the pool of liquid water. Water feed 410 having process conditions indicated at point C is introduced at the top of vessel 490. Steam flash vaporizes from the boiler feed water thereby forming steam 426 and a residual liquid water 428. Steam 400 having process conditions indicated at point D is introduced into vessel 490 below the stripping section 480 and above the pool of liquid water. The injected steam and steam that flash vaporized from the boiler feed water strip dissolved gases from make-up water 410. Vent stream 494 comprising the dissolved gases and having process conditions indicated at point E is withdrawn from the top of vessel 490. Boiler feed water 440 having process conditions at point F is withdrawn from the bottom of vessel 490.

The energy recovered from the hot process stream for example 5 (flash vaporization with steam injection case) is 10.5 MW compared to only 7.5 MW for the example 1 (comparative case) resulting in a better overall energy efficiency for the process when boiler feed water is flash vaporized.

TABLE 5

Stream conditions for Example 5.

| Stream | Flow Rate (kg/h) | Temperature (°C.) | Pressure (kPa) |
|---|---|---|---|
| A | 136,078 | 50 | 1135 |
| B | 136,078 | 116.3 | 1066 |
| C | 158,758 | 97 | 343 |
| D | 2,020 | 148 | 446 |
| E | 794 | 108 | 136 |
| F | 296,064 | 108 | 136 |

We claim:

1. A method for removing dissolved gases from a water feed in a catalytic steam reforming process, the method comprising:
   (a) heating a first portion or all of a boiler feed water stream in a heat exchanger by indirect heat transfer with at least one of a reformate stream from the catalytic steam reforming process and a combustion product gas stream from the catalytic steam reforming process;
   (b) flash vaporizing the boiler feed water stream thereby forming steam and a residual liquid water, the boiler feed water stream having a first temperature and a first pressure prior to flash vaporizing;
   (c) stripping dissolved gases from the water feed with the steam formed in step (b) thereby forming additional boiler feed water from the water feed; and
   (d) combining the additional boiler feed water with the residual liquid water for use as boiler feed water in the catalytic steam reforming process.

2. The method of claim 1 wherein the dissolved gases stripped from the water feed form gases in a vent stream also containing steam, and wherein at least 20% of the energy required to convert water at a pressure and temperature of the water feed into steam at a mass flow rate, pressure, and temperature of the vent stream is provided by the boiler feed water stream.

3. The method of claim 2 wherein at least 50% of the energy required to convert water at a pressure and temperature of the water feed into steam at a mass flow rate, pressure, and temperature of the vent stream is provided by the boiler feed water stream.

4. The method of claim 1 wherein the first temperature ranges from 110° C. to 155° C. and the first pressure ranges from 450 kPa to 1500 kPa.

5. The method of claim 1 wherein the boiler feed water flash vaporized in step (b) is flashed to a pressure less than 450 kPa.

6. The method of claim 1 wherein the first portion or all of the boiler feed water stream heated in step (a) has a temperature less than 95° C. and a pressure ranging from 450 kPa to 1500 kPa prior to heating.

7. The method of claim 1 further comprising:
   measuring the first pressure;
   comparing the measured first pressure to a set point pressure criterion for the first pressure; and
   adjusting the first pressure with a pressure control valve in response to comparing the measured first pressure with the set point pressure criterion for the first pressure.

8. The method of claim 7 wherein the first portion of the boiler feed water stream is heated in the heat exchanger and a second portion of the boiler feed water stream bypasses the heat exchanger; the method further comprising:
   (e) blending the first portion of the boiler feed water stream with the second portion of the boiler feed water stream prior to step (b).

9. The method of claim 8 wherein the first portion of the boiler feed water stream has a first mass flow rate, $F_1$, and the second portion of the boiler feed water steam has a second mass flow rate, $F_2$, wherein the first portion and second portion are blended with a mass flow rate ratio, $$\frac{F_1}{F_2},$$

the method further comprising:
   measuring the temperature of the boiler feed water stream (20) prior to step (b) and after step (e);
   comparing the measured temperature to a set point temperature criterion;
   increasing the mass flow rate ratio, $$\frac{F_1}{F_2},$$

when the measured temperature is less than required by the set point temperature criterion; and
   decreasing the mass flow rate ratio, $$\frac{F_1}{F_2},$$

when the measured temperature is greater than required by the set point temperature criterion.

10. The method of claim 9 wherein the boiler feed water stream flash vaporized in step (b) is flash vaporized in a vessel, the method further comprising:
   measuring a pressure representative of the vapor pressure in the vessel;
   comparing the measured pressure to a set point pressure criterion for the vapor pressure in the vessel;
   changing the set point temperature criterion to require a higher measured temperature when the measured pressure is less than required by the set point pressure criterion for the vapor pressure in the vessel; and
   changing the set point temperature criterion to require a lower measured temperature when the measured pressure is greater than required by the set point pressure criterion for the vapor pressure in the vessel.

11. The method of claim 10 wherein the first portion or all of the boiler feed water stream is heated in the heat exchanger by indirect heat transfer with the reformate stream, the method further comprising:

separating the reformate stream from the heat exchanger in a pressure swing adsorber to form a hydrogen product gas and a pressure swing adsorber residual gas.

12. The method of claim 11 wherein the first portion or all of the boiler feed water stream is heated in the heat exchanger by indirect heat transfer with the combustion product gas stream, the method further comprising:
separating a reformate stream from the catalytic steam reforming process, which reformate stream can be the reformate stream of step (a), in a pressure swing adsorber to form a hydrogen product gas and a pressure swing adsorber residual gas; and
combusting the pressure swing adsorber residual gas with an oxidant gas external to a plurality of catalyst containing reforming tubes in a reforming furnace, thereby forming the combustion product gas stream.

13. The method of claim 1 wherein the first portion of the boiler feed water stream is heated in the heat exchanger and a second portion of the boiler feed water stream bypasses the heat exchanger; the method further comprising:
(e) blending the first portion of the boiler feed water stream with the second portion of the boiler feed water stream prior to step (b).

14. The method of claim 13 wherein the first portion of the boiler feed water stream has a first mass flow rate, $F_1$, and the second portion of the boiler feed water steam has a second mass flow rate, $F_2$, wherein the first portion and second portion are blended with a mass flow rate ratio, $$\frac{F_1}{F_2},$$

the method further comprising:
measuring the temperature of the boiler feed water stream (20) prior to step (b) and after step (e);
comparing the measured temperature to a set point temperature criterion;
increasing the mass flow rate ratio, $$\frac{F_1}{F_2},$$

when the measured temperature is less than required by the set point temperature criterion; and
decreasing the mass flow rate ratio, $$\frac{F_1}{F_2},$$

when the measured temperature is greater than required by the set point temperature criterion.

15. The method of claim 14 wherein the boiler feed water stream flash vaporized in step (b) is flash vaporized in a vessel, the method further comprising:
measuring a pressure representative of the vapor pressure in the vessel;
comparing the measured pressure to a set point pressure criterion for the vapor pressure in the vessel;
changing the set point temperature criterion to require a higher measured temperature when the measured pressure is less than required by the set point pressure criterion for the vapor pressure in the vessel; and
changing the set point temperature criterion to require a lower measured temperature when the measured pressure is greater than required by the set point pressure criterion for the vapor pressure in the vessel.

16. The method of claim 1 wherein the mass flow rate of the at least one of the reformate stream and the combustion product gas stream passed to the heat exchanger is regulated to control heating between the first portion or all of the boiler feed water stream and the at least one of the reformate stream and the combustion product gas stream.

17. The method of claim 16, further comprising:
measuring the temperature of the boiler feed water stream prior to step (b);
comparing the measured temperature to a set point temperature criterion;
increasing the mass flow rate of the at least one of the reformate stream and the combustion product gas stream passed to the heat exchanger when the measured temperature is less than required by the set point temperature criterion; and
decreasing the mass flow rate of the at least one of the reformate stream and the combustion product gas stream passed to the heat exchanger when the measured temperature is greater than required by the set point temperature criterion.

18. The method of claim 17 wherein the boiler feed water stream flash vaporized in step (b) is flash vaporized in a vessel, the method further comprising:
measuring a pressure representative of the vapor pressure in the vessel;
comparing the measured pressure to a set point pressure criterion for the vapor pressure in the vessel;
changing the set point temperature criterion to require a higher measured temperature when the measured pressure is less than required by the set point pressure criterion for the vapor pressure in the vessel; and
changing the set point temperature criterion to require a lower measured temperature when the measured pressure is greater than required by the set point pressure criterion for the vapor pressure in the vessel.

19. The method of claim 1 wherein the first portion or all of the boiler feed water stream is heated in the heat exchanger by indirect heat transfer with the reformate stream, the method further comprising:
separating the reformate stream from the heat exchanger in a pressure swing adsorber to form a hydrogen product gas and a pressure swing adsorber residual gas.

20. The method of claim 1 wherein the first portion or all of the boiler feed water stream is heated in the heat exchanger by indirect heat transfer with the combustion product gas stream, the method further comprising:
separating a reformate stream from the catalytic steam reforming process, which reformate stream can be the reformate stream of step (a), in a pressure swing adsorber to form a hydrogen product gas and a pressure swing adsorber residual gas; and
combusting the pressure swing adsorber residual gas with an oxidant gas external to a plurality of catalyst containing reforming tubes in a reforming furnace, thereby forming the combustion product gas stream.

* * * * *